(12) United States Patent
Wei (10) Patent No.: US 6,874,722 B2
(45) Date of Patent: Apr. 5, 2005

(54) WIRE WINDING DEVICE HAVING WIRE STORING IDLE WHEELS

(76) Inventor: Jose Wei, No. 17-2, Pai Ling 1$^{st}$ Rd., Hsin Tien City, Taipei Hsien (TW)

( * ) Notice: Subject to any disclaimer, the term of this patent is extended or adjusted under 35 U.S.C. 154(b) by 12 days.

(21) Appl. No.: 10/422,012

(22) Filed: Apr. 24, 2003

(65) Prior Publication Data

US 2004/0159734 A1 Aug. 19, 2004

(30) Foreign Application Priority Data

Feb. 17, 2003 (TW) .................................. 92202473 U (51) Int. Cl.$^7$ ............................................. B65H 75/28
(52) U.S. Cl. ................. 242/378; 242/378.1; 242/378.2; 242/378.4; 242/388.6; 191/12.2 R
(58) Field of Search ................. 242/372, 378, 242/388.6, 376, 378.1, 378.2, 378.4; 191/12.2 R, 12.4

(56) References Cited

U.S. PATENT DOCUMENTS

| | | | |
|---|---|---|---|
| 1,384,153 A | * 7/1921 | Roos | ..................... 242/388.91 |
| 5,700,150 A | * 12/1997 | Morin | ........................... 439/4 |
| 6,434,249 B1 | * 8/2002 | Wei | ............................ 381/370 |
| 6,520,444 B1 | * 2/2003 | Muller | .................... 242/378.4 |
| 6,715,214 B1 | * 4/2004 | Lin | ............................. 33/755 |

* cited by examiner

Primary Examiner—Eileen D. Lillis
Assistant Examiner—Sang Kim
(74) Attorney, Agent, or Firm—Dennison, Schultz, Dougherty & MacDonald (57) ABSTRACT

A wire winding device having wire storing idle wheels includes a main turning wheel capable of elastic rotation and flexibly connected to a main axis, and a plurality of turning wheels having different or same diameters formed on the main body of the main turning wheel for forming a plurality of storage grooves; at least one passive turning wheel having at least one storage groove formed on the wheel surface thereof, and the passive turning wheel is flexibly connected to a secondary axis; and a wire portion consisted of upper and lower wires winded in the storage grooves of the main turning wheel and the passive turning wheel. Through the coordination of the passive turning wheel and the main turning wheel of the device, wires having greater lengths may be stored and released.

10 Claims, 12 Drawing Sheets

WIRE WINDING DEVICE HAVING WIRE STORING IDLE WHEELS

BACKGROUND OF THE INVENTION (a) Field of the Invention

The invention relates to a wire winding device having wire storing idle wheels, and more particularly, to a wire winding device having wire storing idle wheels for storing and release wires of great lengths.

(b) Description of the Prior Art

Referring to U.S. Pat. No. 6,434,249B1 "Earphone Wire Winding Box with Coaxial and Dual Wheels", although the structure disclosed by the inventor hereby is indeed practical, however, in order to release a longer upper wire S3 of the wire portion therein and to store a greater volume of the upper wire S3 in a storage groove 15, it is essential to increase the diameter of a big turning wheel 10. As a result, not only the volume of the wire winding box thereof is inevitably enlarged, but also the length of the upper wire S3 released or stored yet remains limited.

Therefore, it is a vital task of the invention as how to store wires of larger amounts and greater lengths.

SUMMARY OF THE INVENTION

The object of the invention is to provide a wire winding device having wire storing idle wheels, wherein a passive turning wheel works in coordination with a main turning wheel thereof, so as to store and release wires of greater lengths.

Another object of the invention is to provide a wire winding device having wire storing idle wheels, and the structure according to the invention is combined with a housing of an electric appliance, so as to integrate the invention as a part of the electric appliance.

The other object of the invention is to provide a wire winding device having wire storing idle wheels, wherein the main turning wheel and the passive turning wheel thereof are disposed with a plurality of storage grooves for storing upper and lower wires, so as to release at a large volume or store plugs (sockets) at the two ends of the upper and lower wires from and in an accommodating groove of the device.

DETAILED DESCRIPTION OF THE PREFERRED EMBODIMENTS

Figure 1:
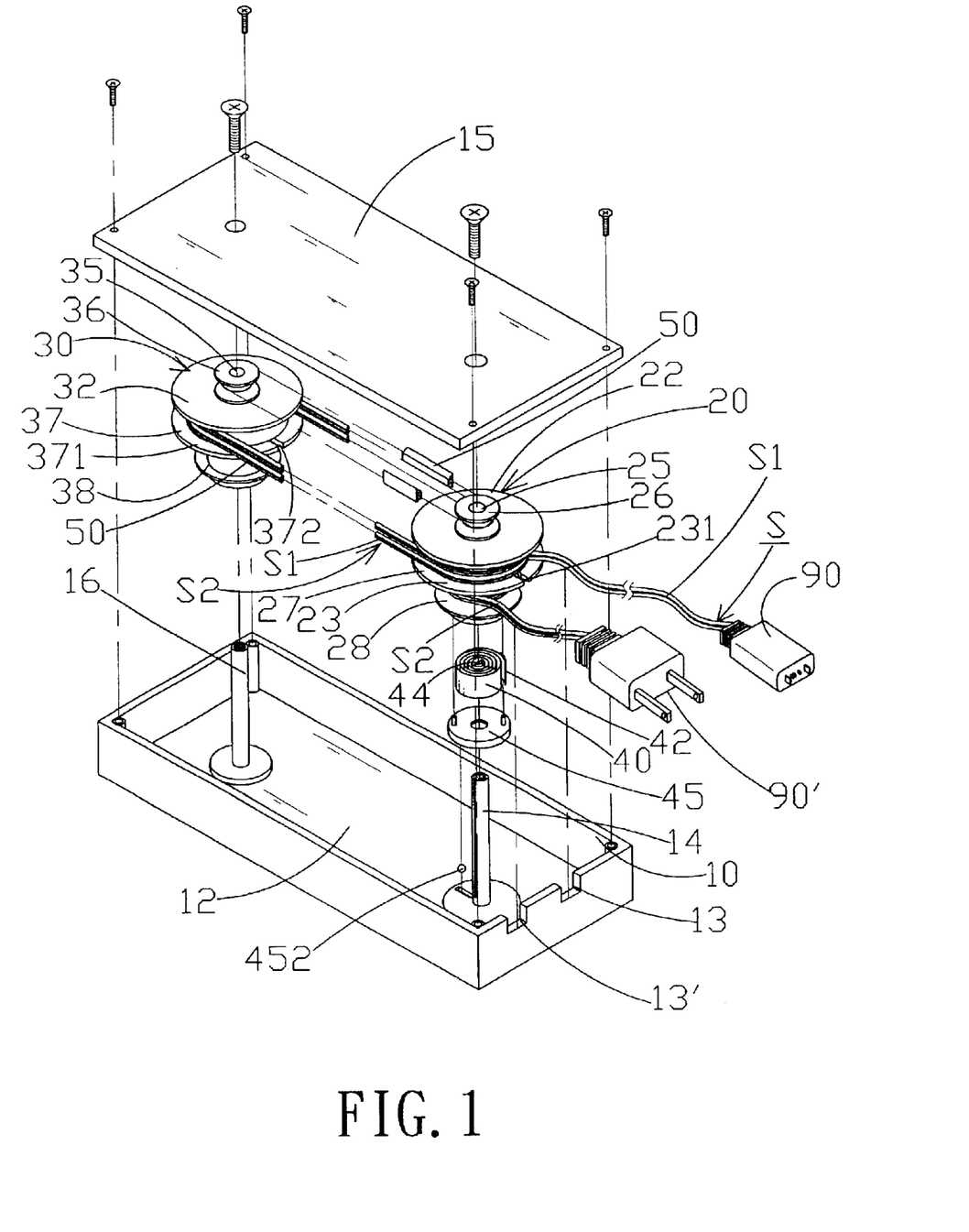
FIG. 1 shows an exploded elevational view according to the invention.
Figure 2:
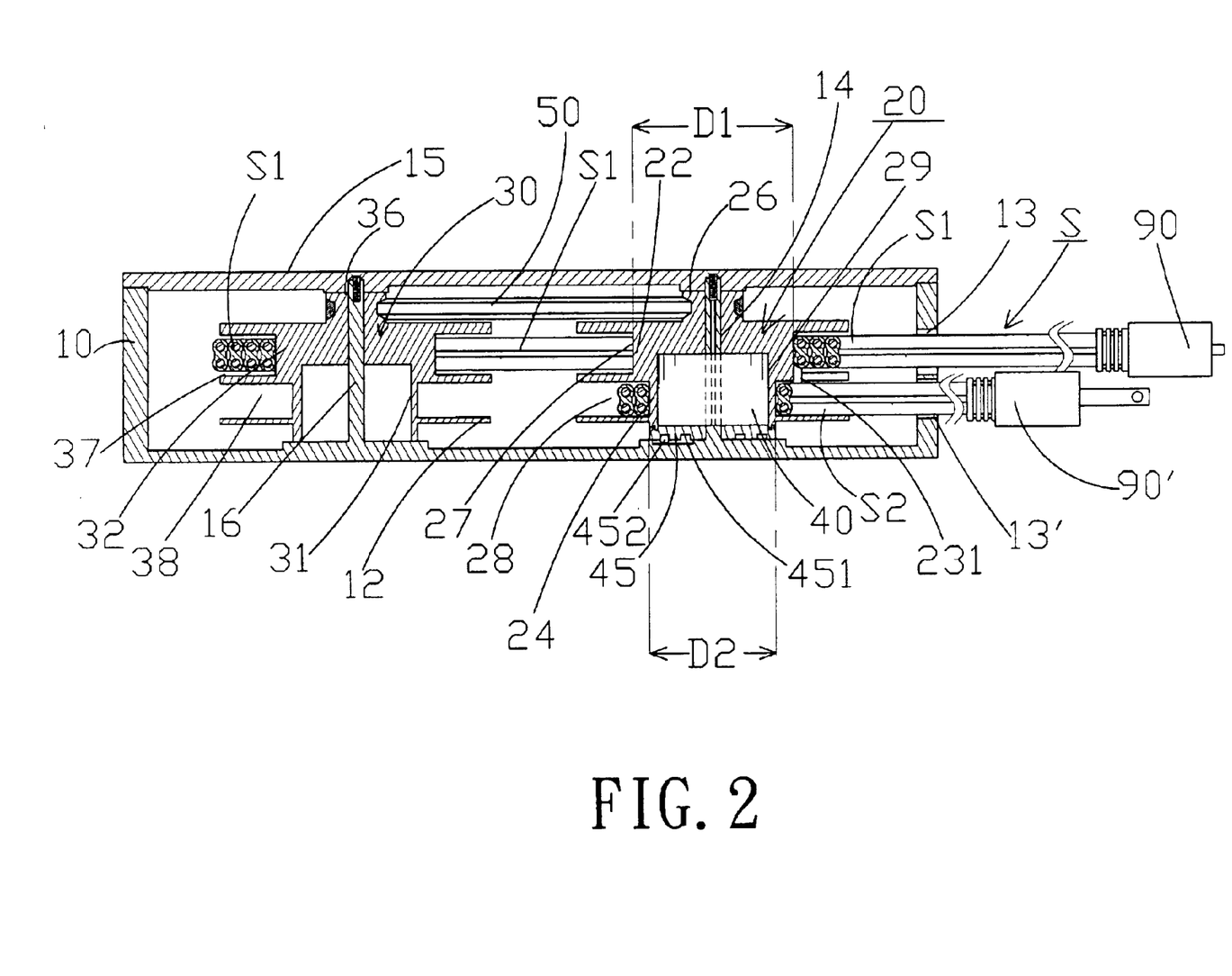
FIG. 2 shows a sectional view according to the invention.

Referring to FIGS. 1 and 2 showing the wire concentration device having a wire storage idle wheel, wherein the characteristics thereof is that:

a main wheel turning wheel 20 having elasticity for rotation, a turning wheel 22 and B turning wheel 24 disposed at the main body thereof, and center orifice 25 of the turning wheels pivotally connected to a main axis 14;

A and B storage grooves 27 and 28 formed on the wheel surfaces of the A and B turning wheels 22 and 24, respectively;

at least one rotatable passive turning wheel 30, a wire storage turning wheel 32 formed on the main body thereof, at least one storage groove 37 formed on the wheel surface of the wire storage turning wheel 32, a center orifice 35 of the passive turning wheel 30 flexibly connected into a secondary axis 16, wherein between the secondary axis 16 and the main axis 14 is a predetermined distance L; and a wire portion S consisted of an upper and a lower wire S1 and S2, wherein the upper wire S1 is winded in the A storage groove 27 of the wheel surface of the A turning wheel 22 and the storage groove 37 of the passive turning wheel 30, and the lower wire S2 is winded in the B storage groove 28 of the B turning wheel 24.

According to the aforesaid primary characteristics, wherein at the top of the main turning wheel 20 and the passive turning wheel 30 form integrals with an interlocking wheel 26 and 36, respectively, and an interlocking element 50 is connected to the plurality of interlocking wheels 26 and 36 so as to have the main turning wheel 20 indirectly impel the passive turning wheel 30 for simultaneous rotation.

According to the aforesaid primary characteristics, wherein an outer end 42 of an elastic element 40 is connected to an inner recess 29 at the side of the main turning wheel 20 while the other inner end 44 is fastened and connected to the main axis 14, so as to provide the main turning wheel 20 with elastic rotation.

Figure 9:
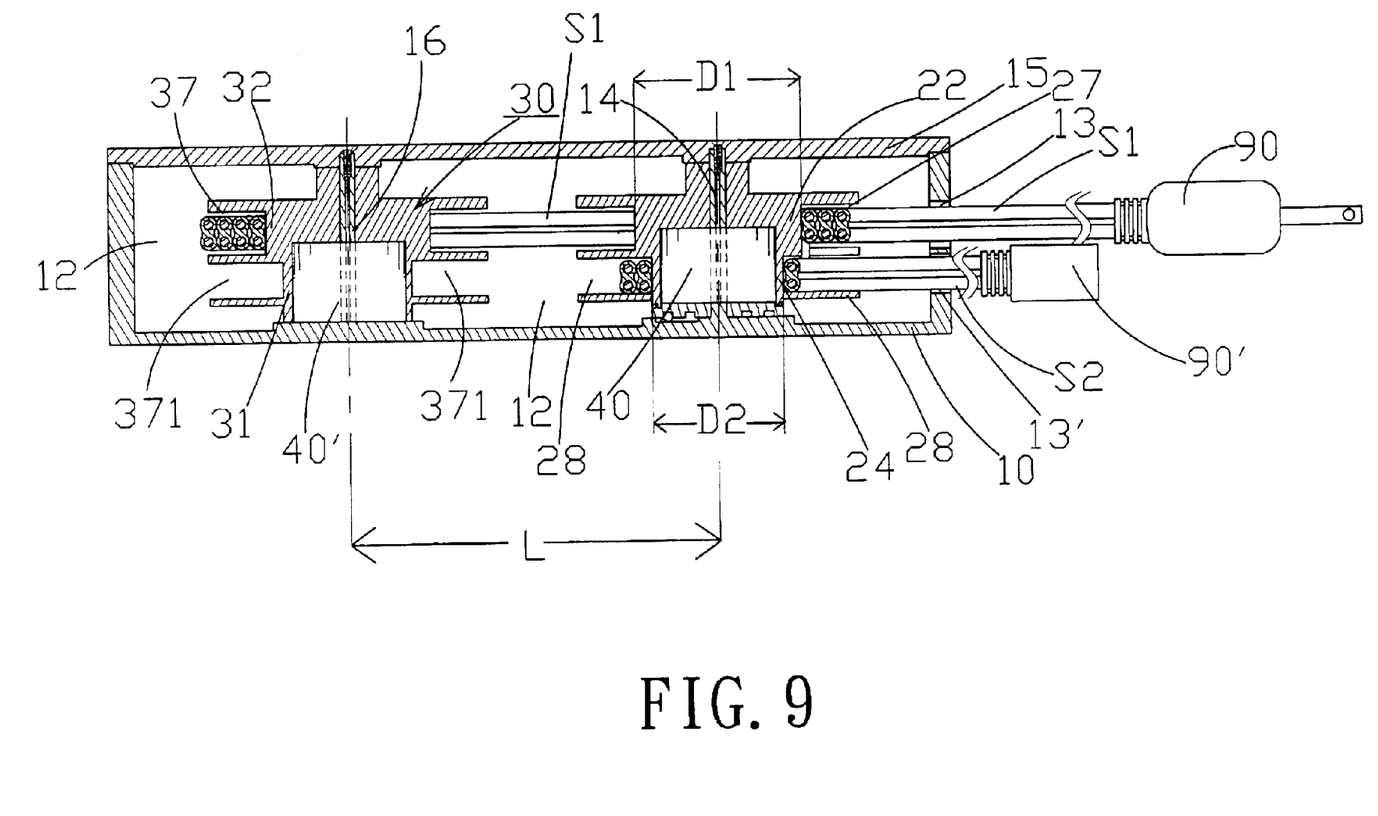
FIG. 9 shows a sectional view illustrating the plurality of passive turning wheels being provided with a spring according to the invention.

According to the aforesaid primary characteristics, wherein at a lateral side of the passive turning wheel 30 is disposed with an inner recess 31, an elastic element 40' having an outer end 42 is connected and fixed to the wall surface of the inner recess 31 while the other inner end 44 is fastened and connected to the secondary axis 16, so as to allow the passive turning wheel 30 to rotate actively (as shown in FIG. 9).

According to the aforesaid primary characteristics, wherein the A turning wheel 22 and the B turning wheel 24 have different diameters D1 and D2.

Figure 10:
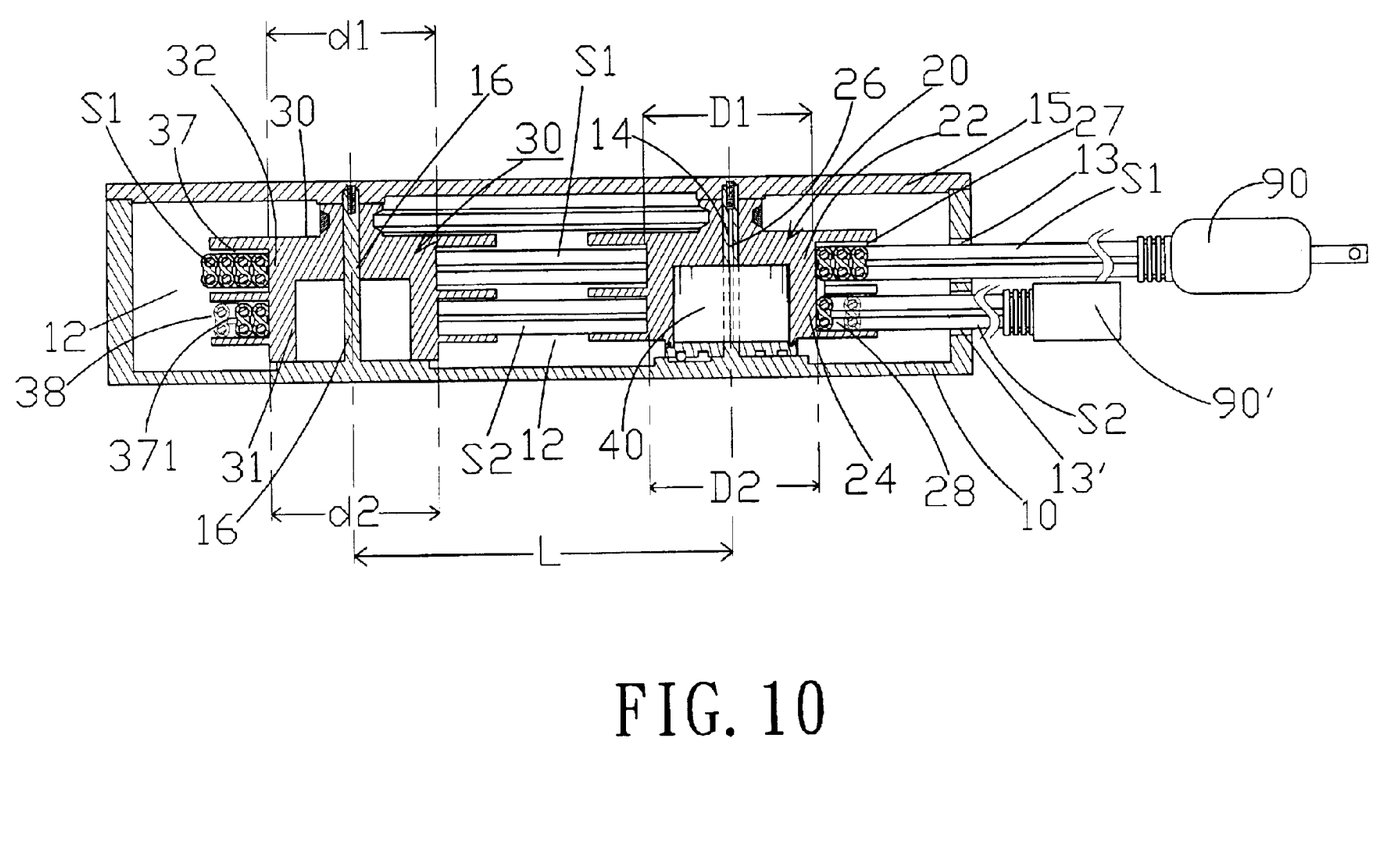
FIG. 10 shows a sectional view illustrating the main turning wheel and the passive turning wheel being provided with two storage grooves, respectively, in an embodiment according to the invention.

According to the aforesaid primary characteristics, wherein the A turning wheel 22 and the B turning wheel 24 have same diameters D1 and D2 (as shown in FIG. 10).

According to the aforesaid primary characteristics, wherein the main axis 14 and the secondary axis 16 are disposed in an inner housing 10 in a protruding manner; an outer housing 15 is connected within the inner housing 10 for accommodating the main turning wheel 20 and the passive turning wheel 30 in an inner accommodating recess 12 of the inner and outer housings 10 and 15; the inner and outer housings 10 and 15 are combined into one body having at least one guiding orifice 13 and 13' formed at the lateral side thereof, and the upper wire S1 is guided and penetrated through the guiding orifice 13.

According to the aforesaid primary characteristics, wherein a ring-shaped partition piece 23 having a wedging groove 231 is formed between the A and B storage grooves 27 and 28, and the lower wire S2 is extended into the A storage groove 27 such that the upper and lower wires S1 and S2 are disposed in the wedging groove 231 in a wedged and fixed manner.

Figure 4:
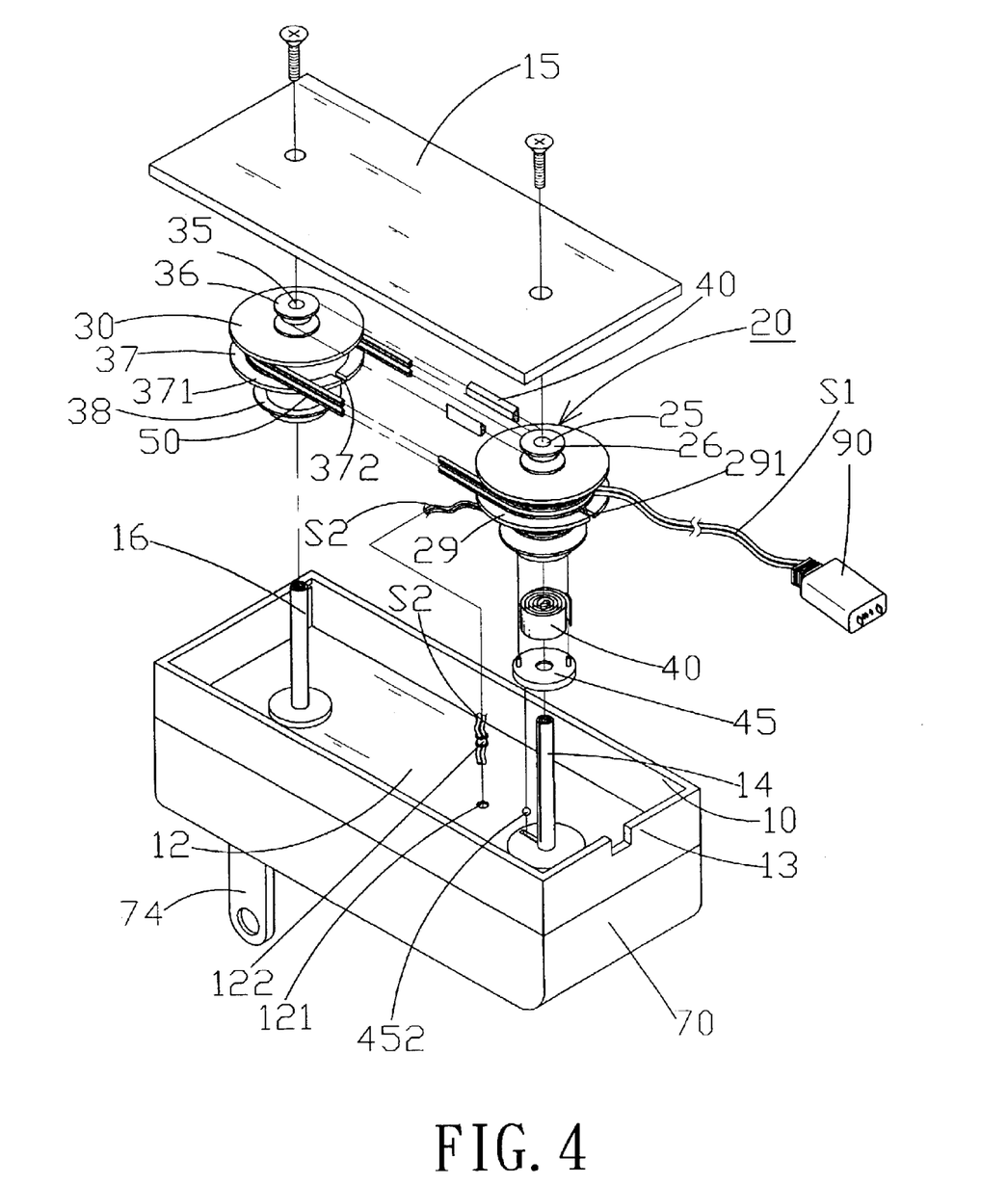
FIG. 4 shows an exploded elevational view illustrating the invention being combined with an electric appliance.
Figure 5A:
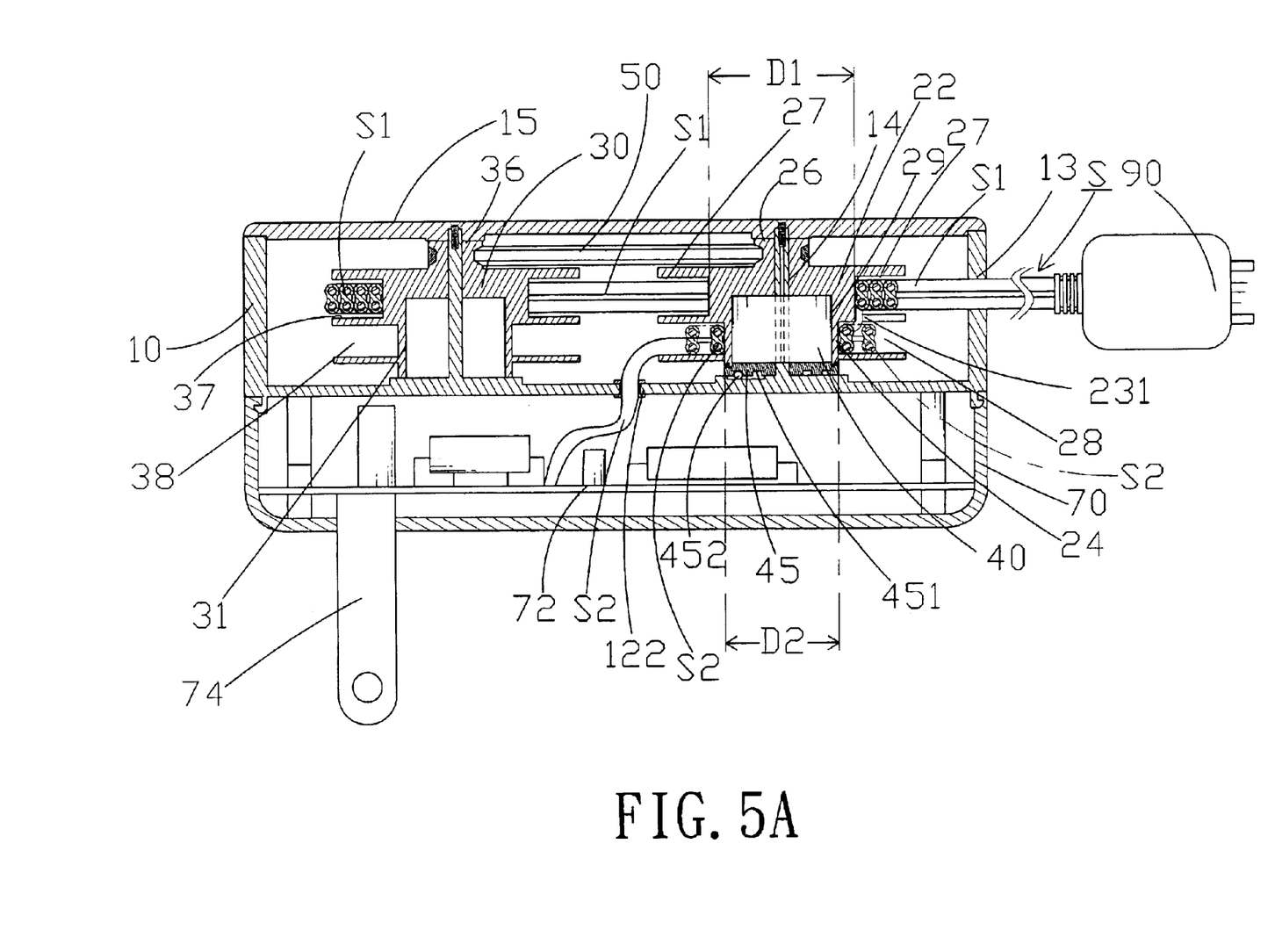
FIG. 5A shows a sectional view illustrating the invention being combined with an electric appliance.

According to the aforesaid secondary characteristics, wherein the lower portion of the inner housing 10 is combined with an appliance housing 70 having a circuit element 72 (as shown in FIGS. 4 and 5); at the exterior of the appliance housing 70 is provided with a conductive plug 74; the lower wire S2 is passed through an orifice 121 provided in advance in the inner housing 10 and an accommodating opening of an anti-slide sheath 122 and then extended into the appliance housing 70 to connect with the circuit element 72 therein; and the lower wire S2 forms an immobile portion due to the tightening of the anti-slide sheath 122.

According to the aforesaid primary characteristics, wherein the wire terminals of the upper and lower wires S1 and S2 are connected to terminal plugs 90 and 90', or sockets.

According to the aforesaid primary characteristics, wherein the lower wire S2 is winded for storage in the lower storage groove 38 of the passive turning wheel 30 and in the B storage groove 28 of the main turning wheel 20 (as shown in FIG. 10).

To better understand the technical characteristics and functions of the invention, descriptions shall be given with the accompanying drawings hereunder.

Figure 3:
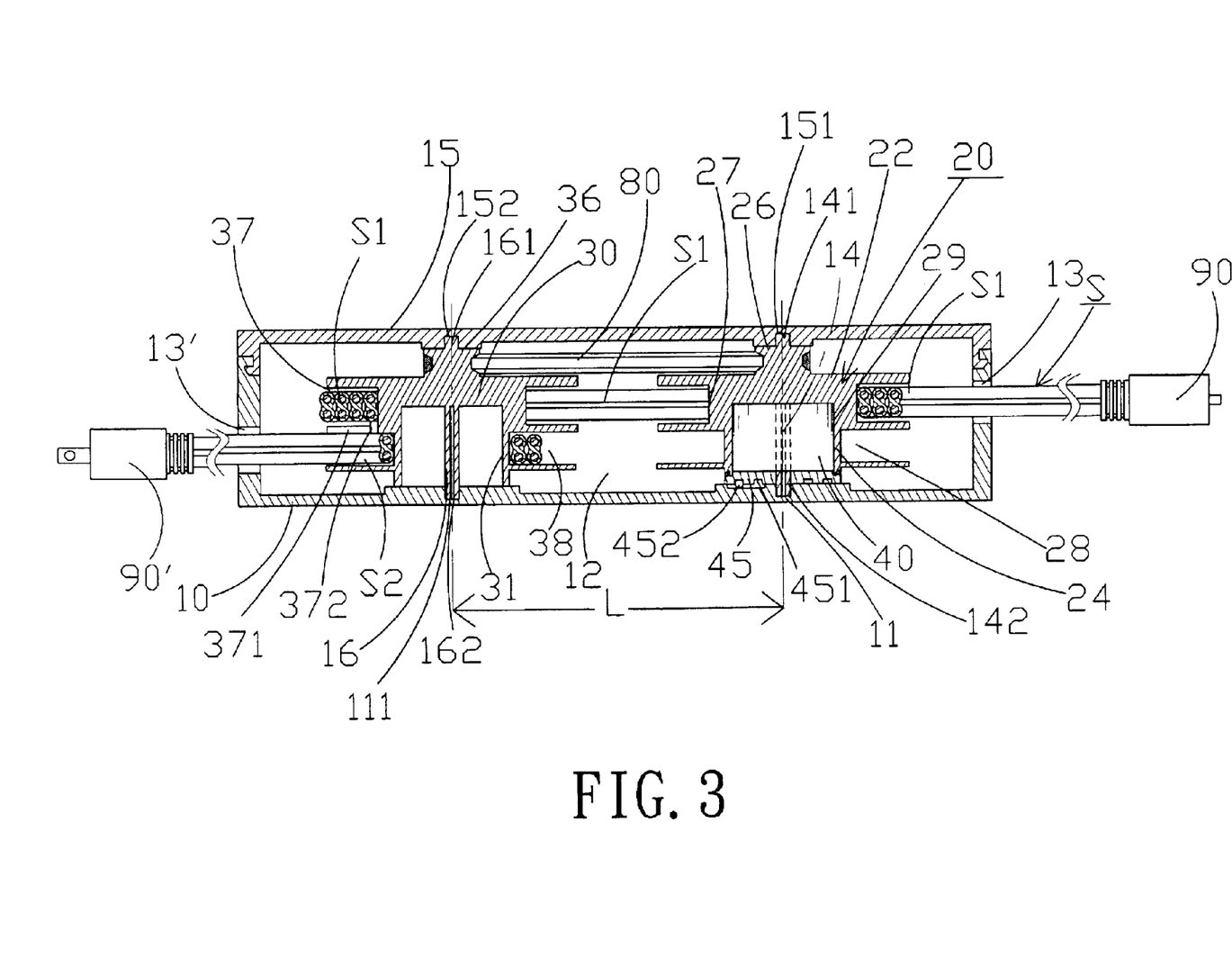
FIG. 3 shows a sectional view illustrating another embodiment according to the invention.
Figure 11:
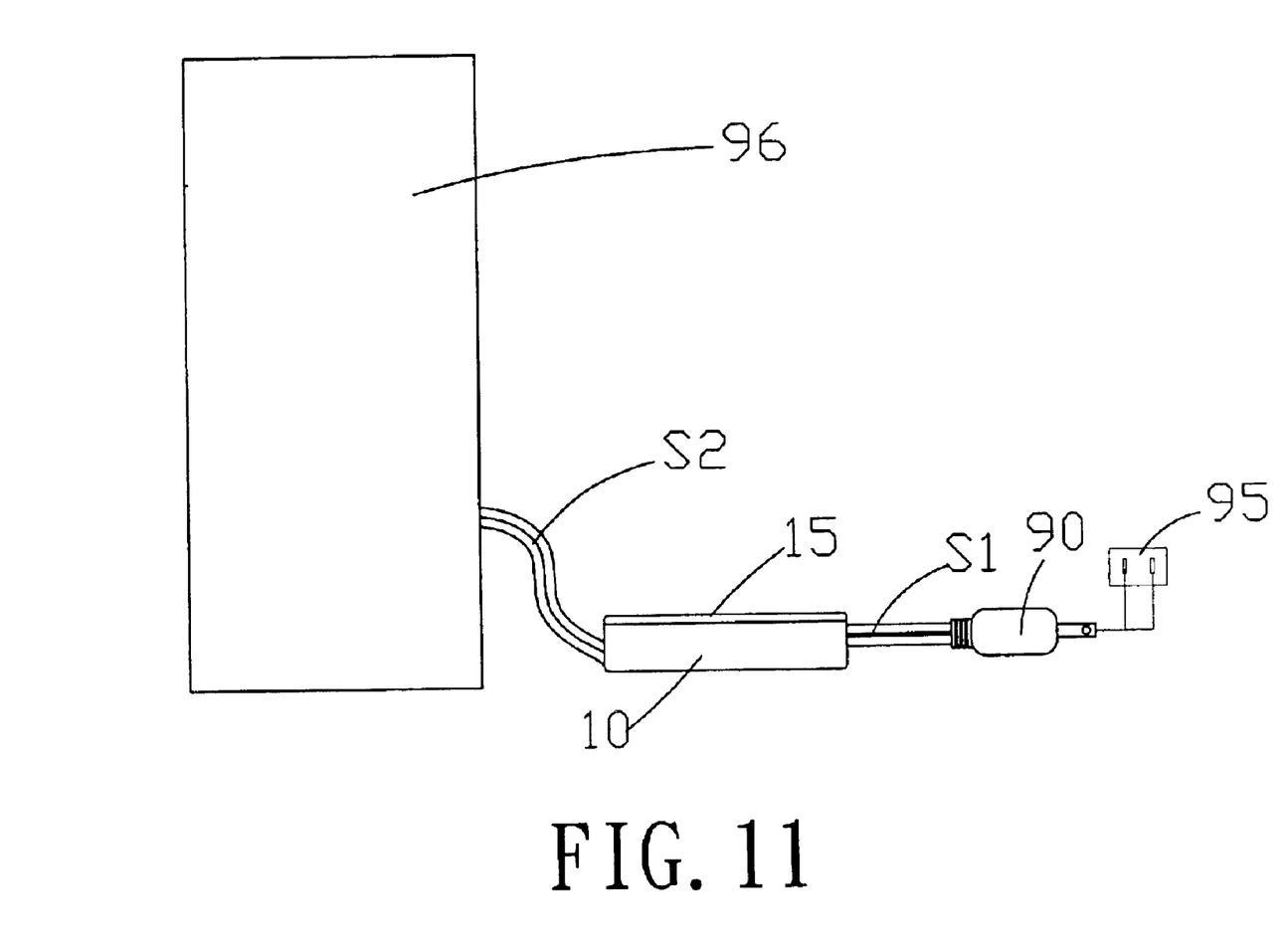
FIG. 11 shows a planar side view illustrating the invention being implemented in a wire winding device of an electric appliance.

1. Referring to FIG. 1 showing an exploded elevational view according to the invention, wherein the wire portion S is winded in the A and B storage grooves 27 and 28, respectively; the wire stored in the A storage groove 27 is defined as the upper wire S1, and the wire stored in the B storage groove 28 is defined as the lower wire S2. The wire portion S is fixed and positioned in the wedging groove 231 and forms a fixed portion, such that when the upper and lower wires S1 and S2 are released respectively, sliding movements are not produced. The interlocking element 50 preferably made of a leather belt is fastened and connected with the interlocking wheels 26 and 36, so as to impel and simultaneous rotate the passive turning wheel 30 when rotating the main turning wheel 20 by applying a force. The upper wire S1 is winded for storage in the storage groove 37 of the passive turning wheel 30 and in the A storage groove 27 of the main turning wheel. For the reason that a distance L (as shown in FIG. 3) exists between the main turning wheel 20 and the passive turning wheel 30, a large amount of the upper S1 can be stored; the greater the distance L, the larger the amount of the upper wire S1 can be stored. Referring to FIG. 2, a large amount of the upper wire S1 is stored as described. The lower wire S2 is winded for storage in the B storage groove 28. The front terminals of the upper and lower wires S1 and S2 are guided and penetrated through two guiding orifices 13 and 13', respectively. The other terminals of the S1 and S2 are connected to plugs (sockets) 90 and 90' of various electric appliances, and the elastic element 40 is preferably made of a metal spring. Because the outer end 42 is fastened to the wall surface of the inner recess 29 and the inner end 44 is fastened to the main axis 14, when the plug (socket) 90 is pulled out, the upper wire S1 is pulled out subsequently, and thus impelling the main turning wheel 20 to rotate regarding the main axis 14 as the center of rotation thereof. Through the interlocking effect of the interlocking element 50, the passive turning wheel 30 is impelled and rotated simultaneously regarding the secondary axis 16 as the center of rotation thereof. At this point, the elastic element 40 is contracted and the upper wire S1 is released at a large amount, thereby significantly increasing the length of the upper wire S1 being released. In the meanwhile, the lower wire S2 is also released at a certain length through the guiding orifice 13 due to the rotation of the main turning wheel 20; however, the length of the lower wire S2 released is shorter than that of the upper wire S1. In this manner, the two plugs 90 and 90' may be plugged into power supplies or sockets 96 of various electric appliances (as shown in FIG. 11). In addition, below the main turning wheel 20 is connected with a turning disk 45 whose surface is disposed with a spiral sliding groove 451 for placing a roller 452. The roller 452 displaces by sliding in the sliding groove 451 so as to provide the main turning wheel 20 with a temporary braking effect; however, this technique is a prior art rather than an intended characteristic of the invention, and therefore the detailed technical descriptions of the structure shall not be unnecessarily illustrated.

When the plugs 90 and 90' are pulled out of sockets, the rotary force of the elastic element 40 causes the main turning wheel 20 to rotate in a reverse direction for wire winding, and the interlocking element 50 is impelled and rotated by the passive turning wheel 30 to simultaneously rotate in a reverse direction with the main turning wheel 20 as well. The upper and lower wires S1 and S2 are then winded back into the A and B storage grooves 27 and 28, and the storage groove 30. Moreover, this winding movement restores the upper wire S1 having a rather great length back into the inner accommodating groove 12 of the inner and outer housings 10 and 15.

2. Referring to FIG. 3 showing a sectional view of another embodiment according to the invention, wherein the main axis 14 and the main turning wheel 20 are a formed integral, the two axis ends 141 and 142 thereof are flexibly connected into circular recesses 11 and 151 provided in advance at the inner and outer housings 10 and 15, respectively. The passive turning wheel 30 and the secondary axis 16 are a formed integral, and the two axis ends 161 and 162 thereof are flexibly connected into circular recesses 111 and 152 provided in advance at the inner and outer housings 10 and 15, respectively. As a result, the main turning wheel 20 and the passive turning wheel 30 are enabled to rotate freely in the circular recesses 11, 111, 151 and 152.

Wherein, below the storage groove 37 of the passive turning wheel 30 is also disposed with a lower storage groove 38. Between the lower storage groove 38 and the storage 37 is a partition piece 371 disposed with a wedging slot 372 by which the upper wire S1 is extended into the lower storage groove 38, so as to store the lower wire S2. At the same time, the upper wire S1 is clamped and fixed into the space of the wedging slot 372, so that the upper and lower wires S1 and S2 do not slide between or toward each other. Two guiding orifices 13 and 13' are disposed at two lateral sides of the inner and outer housings 10 and 15, and hence guiding the upper wire S1 out of the guiding orifice 13 and the lower wire S2 out of the guiding orifice 13'.

Similarly, by pulling or releasing the plugs 90 and 90', the main turning wheel 20 is enabled to rotate in forward and reverse directions and to further impel the passive turning wheel 30 for simultaneous rotation, thereby releasing and winding the upper and lower wire S1 and S2 from and into the accommodating recess 12.

3. Referring to FIG. 4, at the lower surface of the inner housing 10 is connected to an electric appliance housing 70 that may be a battery charger, at the lower surface of the inner accommodating recess 12 is provided with an orifice 121 for placing and connecting an anti-slide sheath 122, and the lower wire S2 is penetrated through the anti-slide sheath 122 to further connect the conductive end thereof to the circuit element 72 (and circuit board).

Referring to FIG. 5A showing a sectional view illustrating the invention being connected to the electric appliance housing 70, wherein the upper wire S1 is winded in the storage groove 37 of the passive turning wheel 30 and the A storage groove 27 of the main turning wheel 20, whereas the lower wire S2 is winded in the B storage groove 28. An immobile portion of the upper and lower wires S1 and S2 is formed in the wedging slot 231, and therefore the upper and lower wires S1 and S2 do not slide between and toward each other. A plug 74 of the electric appliance housing 70 is plugged to a power supply, and the terminal 90 thereof is pulled by the hand of the user to rotate the main turning wheel 20, and to further release the upper wire S1 from the storage groove 37 and the a storage groove 27, respectively. It shall be noted that, the diameter D2 of the B turning wheel 24 is far smaller than the diameter D1 of the A turning wheel 21, and consequently the length of the lower wire S2 released is relatively much shorter. When the upper wire S1 is pulled out, the lower wire S2 is also released at a small amount, and thus showing a relaxed (puffy) status in the B storage groove 28. Also, the lower wire S2 located in the interior of the electric appliance housing 70 stays fixed due to the tightening of the anti-slide sheath 122 around the lower wire 52. When plugs 90 and 74 are not inserted into sockets, the main turning wheel 20 and the passive turning wheel 30 are rotated in a reverse direction using the restoring force of the elastic element 40, and hence the released upper wire S1 and the puffy lower wire S2 are quickly winded and restored back in the storage groove 37, the A storage groove 27 and the B storage groove 28.

Figure 5B:
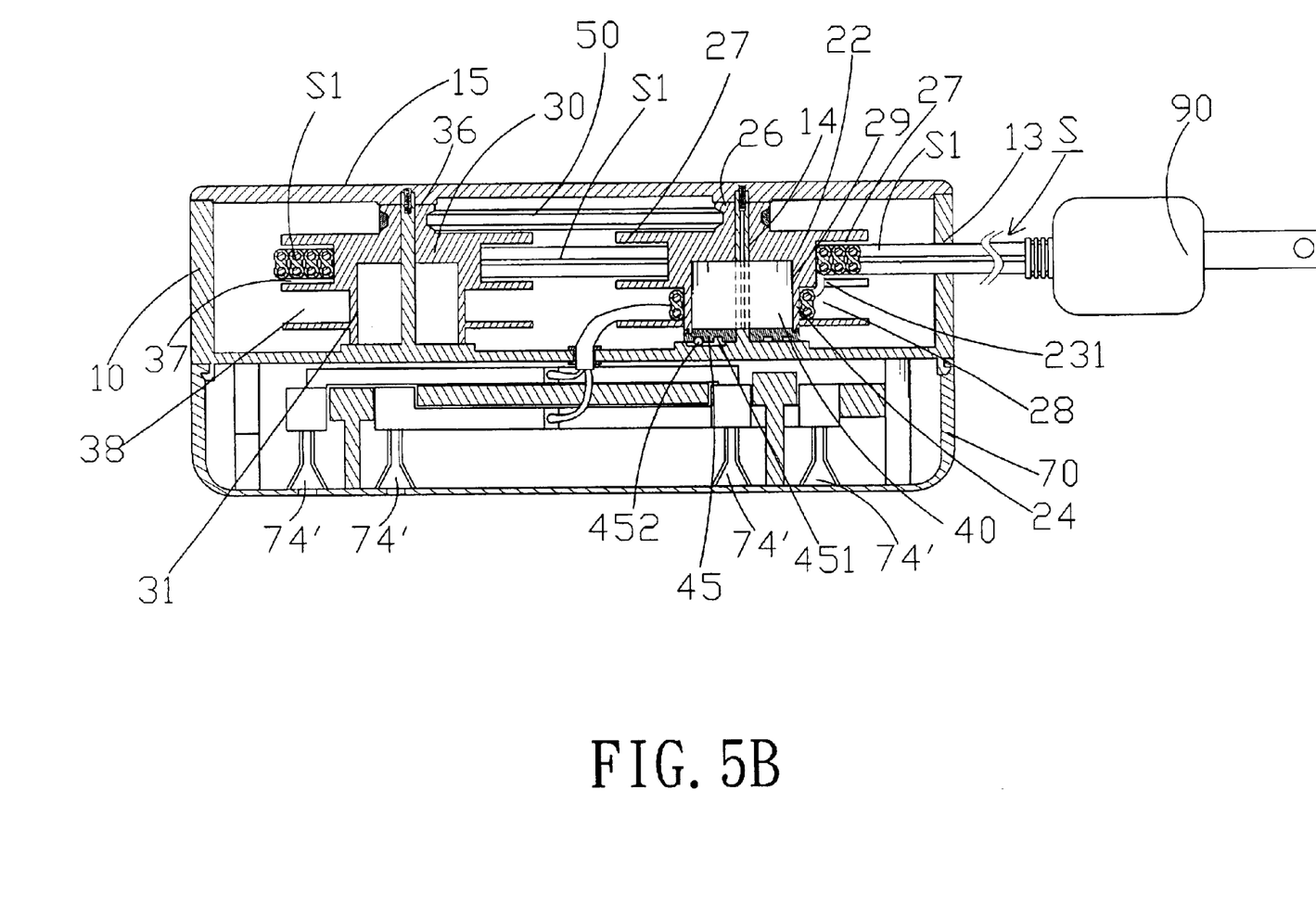
FIG. 5B shows a sectional view illustrating another embodiment according to the invention being combined with an electric appliance.

Referring to FIG. 5, the plug 74 of the electric appliance housing 70 is equivalently replaced by a socket 74'.

Figure 6:
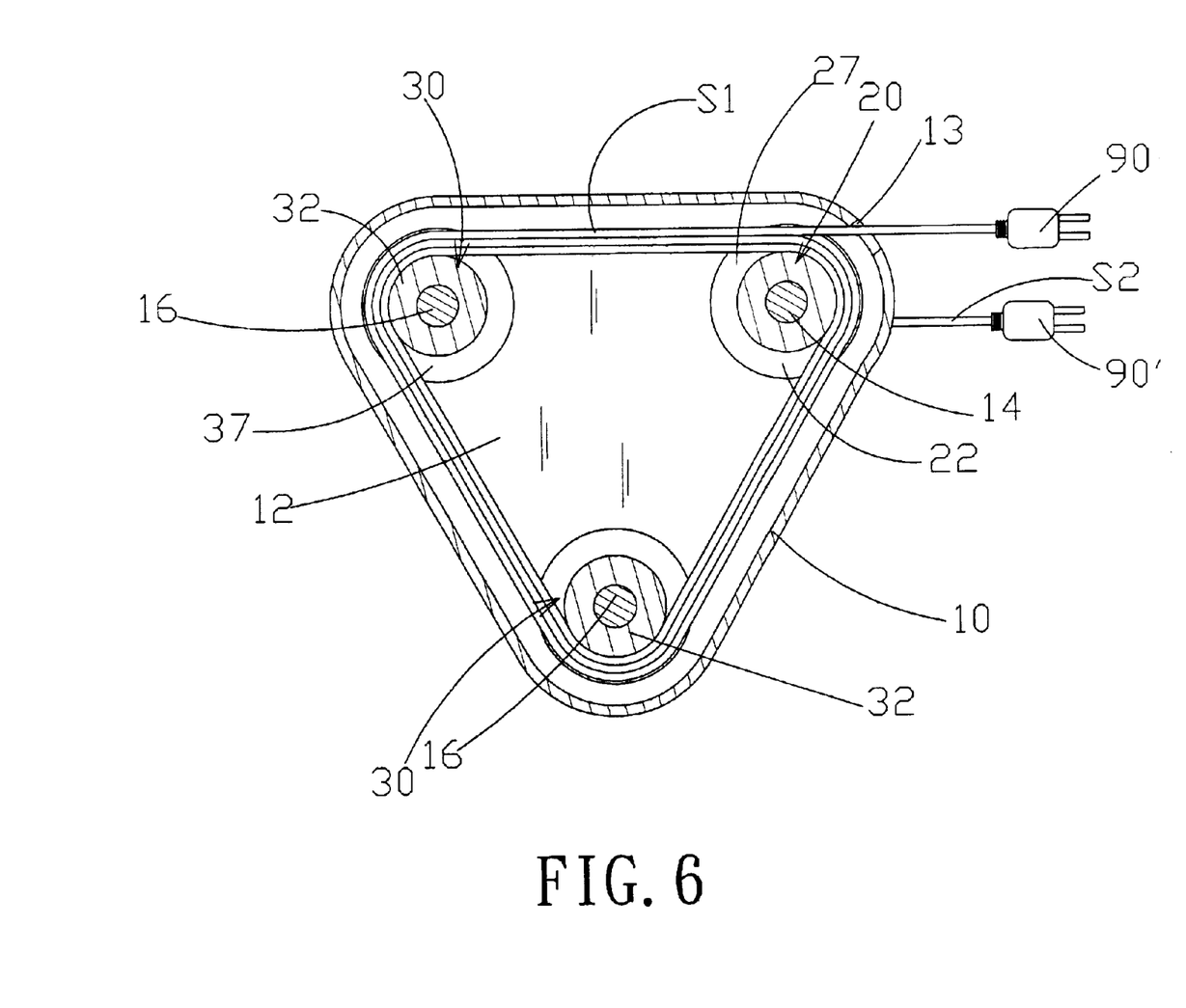
FIG. 6 shows a sectional view illustrating an embodiment having a plurality of passive turning wheels according to the invention.

Referring to FIG. 6, the number of the passive turning wheel 30 is designed as two, and the passive turning wheels 30 and the main turning wheel 20 form a triangular configuration; the more the number of passive turning wheels 30, the greater the length of the upper wire S1 can be stored (or released).

Figure 7:
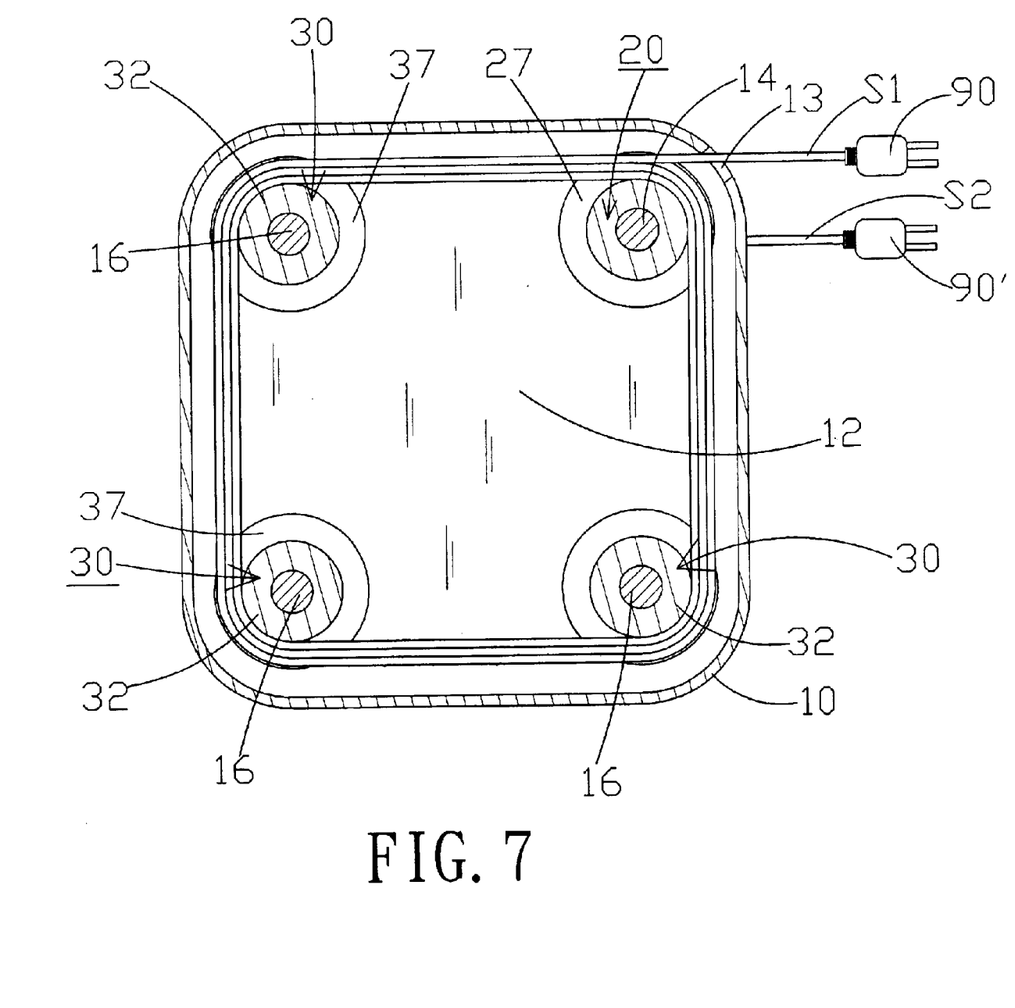
FIG. 7 shows a sectional view illustrating an embodiment having a plurality of passive turning wheels according to the invention.

Referring to FIG. 7, the number of the passive turning wheel 30 is designed as three, and the passive turning wheels 30 and the main turning wheel 20 form a rectangular configuration for storing an even greater length of the upper wire S1.

Figure 8:
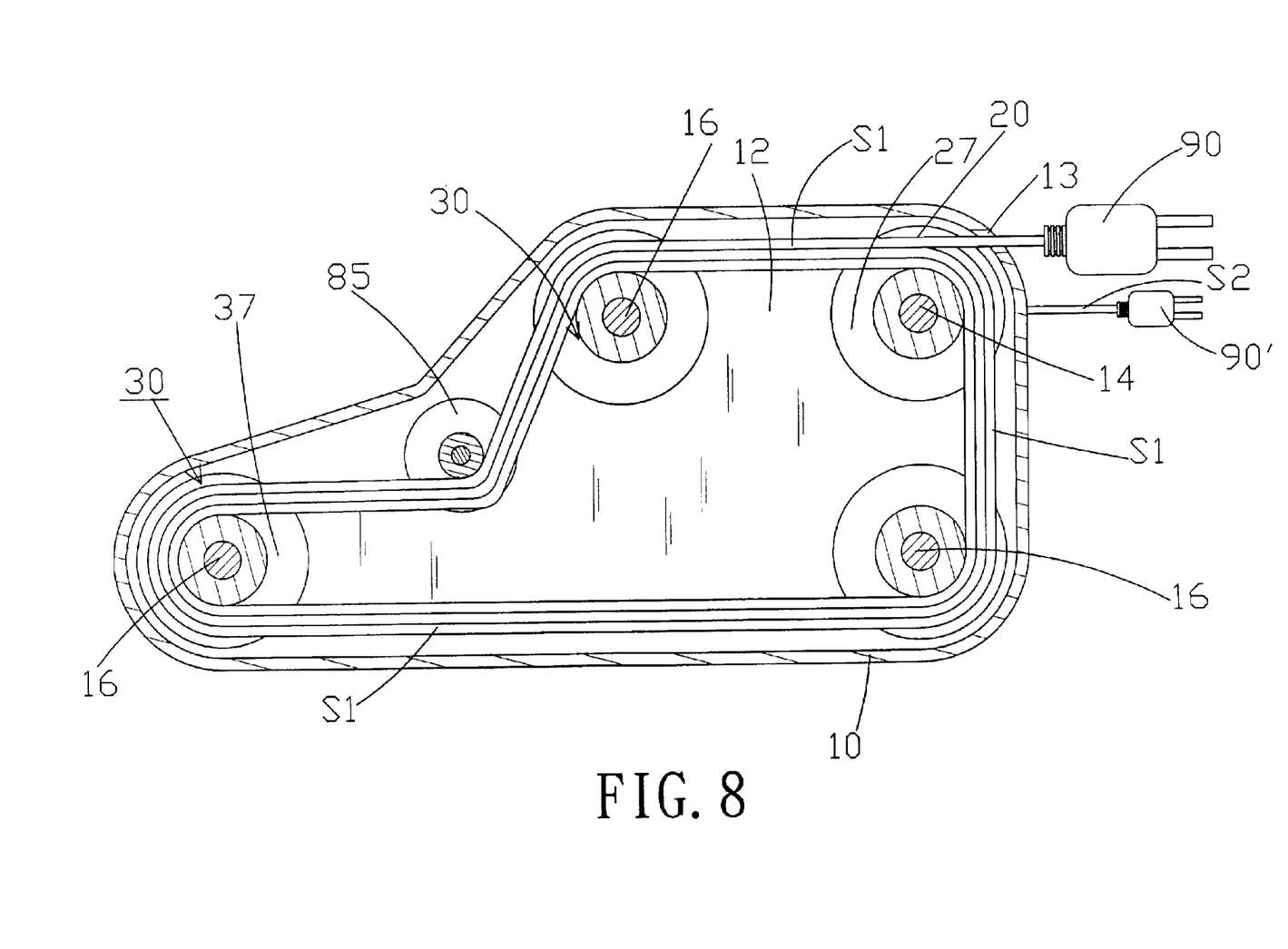
FIG. 8 shows a sectional view illustrating the plurality of passive turning wheels being provided with a sliding wheel in between according to the invention.

Referring to FIG. 8, between the plurality of turning wheels 30 is provided with a passive middle sliding wheel 85 having guiding purposes for guiding the wire direction of the upper wire S1 in order to accurately store the upper wire S1 in the storage groove 37.

Referring to FIG. 9, the inner recess 31 of the passive turning wheel is disposed with an elastic element 40' having an inner end thereof (not shown in the diagram) fastened to the secondary axis 16 and an outer end thereof (not shown in the diagram) fastened to the wall surface of the inner recess 31. Using the above, the passive turning wheel 30 is also provided with an elasticity for rotation as a characteristic, and the interlocking wheels 26 and 36, and the interlocking element 50 may then be discarded. In addition, as long as the elasticity of the elastic elements 40' and 40 is the same, the main turning wheel 20 and the passive turning wheel 30 are able to rotate at a same speed during the winding of the upper wire S1, thereby effectively winding the upper wire S1 into the storage groove 37 and the A storage groove 27 for storage.

Referring to FIG. 10 showing the A and B storage grooves 27 and 28 of the main turning wheel 20 having same diameters D1 and D2 (that is, equal diameters), below the storage groove 37 of the passive turning wheel 30 is provided in advance with a lower storage groove 38, and diameters d1 and d2 of the two wire storage wheel surfaces of a wire storage wheel 32 are equal. Using the aforesaid structure, the upper wire S1 may be winded for storage in the storage groove 37 and the A storage groove 27, whereas the lower wire S2 may be winded for storage in the lower storage groove 38 and the B storage groove 28, thereby storing or releasing greater amounts of upper and lower wires S1 and S2.

Referring to FIG. 11, the plug 90 of the invention may be inserted into a socket 95 and the other plug (not shown in the diagram) may be inserted to an electric appliance 96, thereby implementing the invention as a wire winding device.

Conclusive from the above, according to the invention, the passive turning wheel 30 is located in the accommodating recess 12 to coordinate with the main turning wheel 20, and a certain distance L exists between the two turning wheels, thereby storing (or releasing) wires having great lengths as well as being innovative in nature.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A wire winding device having wire storing wheels, comprising:

a main turning wheel having elasticity for rotation; the main turning wheel includes a main body having a first turning wheel and a second turning wheel having centers thereof flexibly connected to a main axis first and second storage grooves formed on wheel surfaces of the first and second turning wheels, respectively;

at least one passive and rotatable passive turning wheel; the main body having a wire storage turning wheel with a wheel surface thereof disposed with at least one storage groove, a center thereof is flexibly connected into a secondary axis, and between the secondary axis and the main axis has a predetermined distance; and a wire portion consisted of upper and lower wires; the upper wire is wound in the first storage groove of the first turning wheel and the storage groove of the passive turning wheel, and the lower wire is winded in the second storage groove of the second turning wheel, and wherein each of the main turning wheel and the passive turning wheel forms an integral with an interlocking wheel, respectively, and an interlocking element is connected to the plurality of interlocking wheels, so as to have the main turning wheel impel the passive turning wheel for simultaneous rotation.

2. The wire winding device having idle wheels according to claim 1, wherein an outer end of an elastic element is connected into an inner recess at the side of the main turning wheel while an opposite inner end thereof is fastened and connected to the main axis, so as to enable the main turning wheel for elastic rotation.

3. The wire winding device having wire storing idle wheels according to claim 1, wherein at the lateral side of the passive turning wheel is disposed with an inner recess, and an outer end of an elastic element is fastened and connected to wall surface of the inner recess while an opposite inner end thereof is fixed and connected to the secondary axis, so as to enable the passive turning wheel for active rotation.

4. The wire winding device having wire storing idle wheels according to claim 1, wherein the first and second turning wheels have different diameters.

5. The wire winding device having wire storing idle wheels according to claim 1, wherein the first and second turning wheels have a same diameter.

6. The wire winding device having wire storing idle wheels according to claim 1, wherein the main axis and the secondary axis are disposed in an inner housing in a protruding manner; an outer housing is connected within the inner housing by means of a screw for accommodating the main turning wheel and the passive turning wheel in an inner accommodating recess of the inner and outer housings;

and the inner and outer housings are combined into one body having at least one guiding orifice formed at a lateral side thereof, and the upper wire is guided and penetrated through the guiding orifice.

7. The wire winding device having wire storing idle wheels according to claim 6, wherein the lower portion of the inner housing is connected to an electric appliance housing further provided with a conductive plug extended outward, the lower wire is passed through an orifice and an opening of an anti-slide sheath provided in advance to further extend into the electric appliance housing and a circuit element, and forms an immobile portion due to the tightening of the anti-slide sheath.

8. The wire winding device having wire storing idle wheels according to claim 1, wherein a ring-shaped partition piece provided with a wedging groove is formed between the first and second storage grooves, so that the lower wire is extended into the first storage groove, and the upper and lower wires are disposed in the wedging groove in a wedged and fixed manner.

9. The wire winding device having wire storing idle wheels according to claim 1, wherein the ends of the upper and lower wires are connected to terminal plugs or sockets.

10. The wire winding device having wire storing idle wheels according to claim 1, wherein the lower wire is winded for storage in the lower storage groove of the passive turning wheel and the second storage groove of the main turning wheel.

* * * * *